Aug. 31, 1926.
J. E. G. LAHOUSSE
1,598,141
APPARATUS FOR TESTING TEXTILES AND LIKE MATERIALS
Filed March 6, 1925
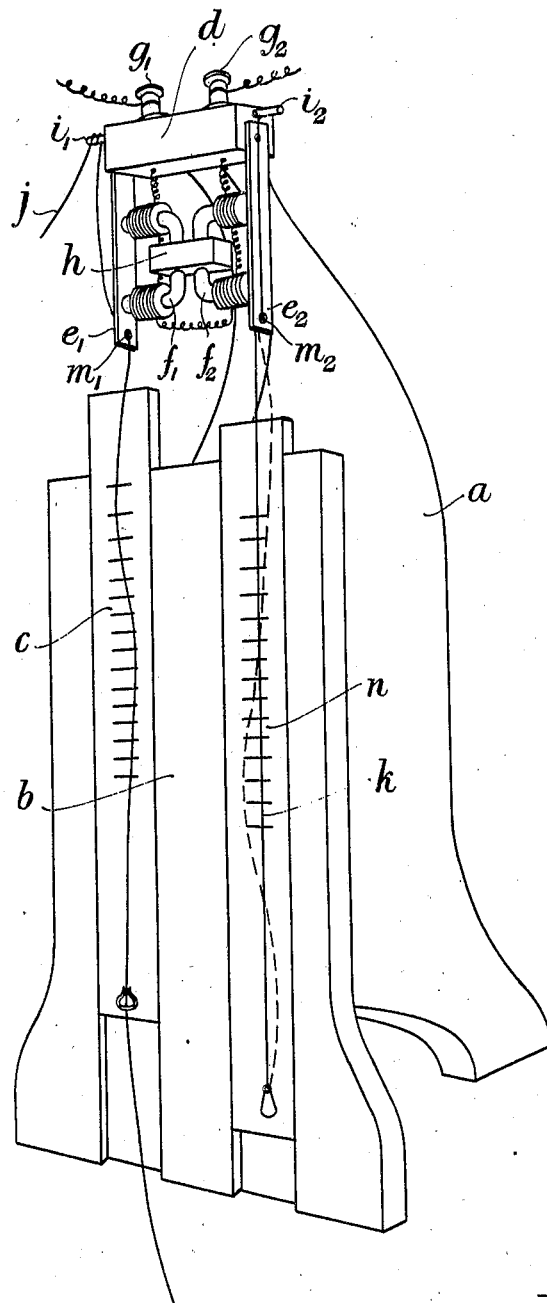
Inventor:
Joseph Edouard Gustave Lahousse
BY: Ruegg, Bayne & Bakelar
ATTORNEYS.

Patented Aug. 31, 1926.

1,598,141

UNITED STATES PATENT OFFICE.

JOSEPH EDOUARD GUSTAVE LAHOUSSE, OF TERNAY, FRANCE, ASSIGNOR TO SOCIETE CHIMIQUE DES USINES DU RHONE, OF PARIS, FRANCE.

APPARATUS FOR TESTING TEXTILES AND LIKE MATERIALS.

Application filed March 6, 1925, Serial No. 13,605, and in Germany March 4, 1924.

The present invention relates to the process for testing textiles and like materials as described in my patent application No. 1,-517,911, in which the grade of the textile is ascertained by observing the position of the nodes produced when said textile is caused to vibrate by means of a tuning fork, as described in said patent specification.

The object of this invention is an apparatus adapted to permit of the vibrations being maintained electrically by alternating current using the electric supply from the ordinary lighting or power mains, while eliminating the errors due to possible variations in the frequency of said supply.

According to this invention, I substitute for the tuning fork, a vibrating member of magnetic material, the vibrations being caused by a bobbin having a magnetic core, preferably laminated in the known manner (said bobbin being placed between the branches of the said vibrating member when the latter is forked), and being connected to the electric supply mains through the usual switch, a suitable resistance being put in circuit if the bobbin has not been designed with a sufficient resistance to suit the voltage of the supply.

It is known that if neither the tuning fork nor the magnetic core is magnetized, the vibrating member must be tuned to a frequency which is double that of the supply; if, on the contrary, the magnetic circuit is polarized, as is done in the case of telephonic receivers, the frequency of the vibrations of the vibrating member is equal to that of the supply. The polarization of the magnetic circuit can be obtained either by magnetizing the vibrating member, considered as a horse-shoe magnet, and made of a suitable steel, or in providing it with a supplementary bobbin, in which passes a continuous current, and located so as to utilize the magnetic circuit in an efficient manner.

Among all the well-known electric arrangements possible for carrying out the purpose in view, I have found that the following is best suited to the process of testing textiles in the manner described.

The vibration-producing device comprises a simple electromagnet in the bobbin of which passes an alternating current from the supply main. This electromagnet is provided with an armature constituted by a single vertical vibrating blade of magnetic material clamped at the upper end and free at the other. This armature is selected so that its period of free vibration is nearly double that of the supply. It is provided at its lower end with a small hole in which the thread to be tested is caused to pass. This thread is fixed in a clamping device located approximately on a vertical line passing through the hole and above the armature. At the bottom, this thread supports a tightening weight, as has been described in the specification referred to above, and the position of its nodes gives the measure of its grade or of its number as is explained in said specification.

With an arrangement so constituted, variations of frequency of the supply would, of course, vitiate the test. In order to avoid this source of error, a comparison thread is provided; another similar arrangement being set up at the side of the arrangement described above, the armature of which sets in vibration a fine standard thread, preferably metallic, kept taut by a known weight.

This weight is naturally selected so that the comparison thread vibrates, with at least one node, with double the normal frequency of the supply. If the latter varies a little, a displacement of the node of this thread takes place, from which displacement the correction to be made to the indications of the scale of the neighboring device carrying the thread to be tested can be deduced as follows:

Let H be the distance of the node under consideration to the point where the tightening weight is suspended to the comparison thread, at a moment when the supply possesses exactly its normal frequency; let $a$ be the increase of this distance due to the variation of frequency of the supply; let $d$ be, as in specification No. 1,517,911, the actual means of unit of length of the thread, and let $d'$ be the observed value of this mass as read on the scale (graduated for the normal frequency of the supply); then, according to the classical theory of vibrating strings:—

$$d = d'\left(1 + \frac{2a}{H}\right),$$

provided $\frac{a}{H}$ be small, which is always the case, since divergencies of frequency of the supplies are, in fact, of the order of $\pm 3$ to $4\%$ at the maximum, $a$ being positive or negative.

The above formula shows that the correct value $d$ is deduced from the observed value $d'$ by addition to the latter of a certain correction (as a percentage) equal to $200\frac{a}{H}$, and this correction may be directly engraved upon a scale placed opposite the comparison thread in the neighborhood of the node to be observed.

The operator who examines a thread has therefore only to give a glance on the comparison thread to know, at every instant, the correction to apply to the measurement taken, according to the method described in specification No. 1,517,911.

The advantage of the present system is that electric maintenance of the vibrations can be obtained without the trouble of regulating a "trembling" arrangement, and without sparking.

The particular form of the apparatus described above is illustrated in the drawing. $a$ is the stand to which is secured the face $b$ of the apparatus, carrying the sliding scale $c$, as described in patent specification No. 1,517,911; at the top of the stand is fixed a yoke $d$ supporting the two vibrating members $e_1$, $e_2$, actuated by the electromagnets $f_1$, $f_2$, secured to the stand by means of a bracket $h$ and to which the current from the main electric supply is conveyed by the terminals $g_1$, $g_2$; $i_1$ is a pin to which the thread $j$ being tested can be momentarily secured by a few turns, after passing it in the hole $m_1$, and $i_2$ is a similar pin to which the comparison thread $k$ is permanently secured after passing it in the hole $m_2$. The scale $c$ is adjusted as explained in patent specification No. 1,517,911 and the correction is found on a scale $n$, fixed or slidably mounted behind the standard thread $k$.

What I claim and desire to secure by Letters Patent is:—

1. An apparatus for testing textiles comprising an electromagnet adapted to be energized by an alternating current, a single blade of magnetic material disposed in the magnetic field of said magnet and adapted to be vibrated thereby, the frequency of vibration of said blade being susceptible of variation, and means for suspending the textile to be tested from said blade whereby the vibrations of the blade are imparted to said textile.

2. An apparatus for testing textiles, comprising a frame, a single vertical blade of magnetic material secured at one end to said frame, said blade being provided with means for suspending the textile to be tested therefrom, and electrical means for subjecting the blade to the vibrating action of an alternating current, said blade being sufficiently thin to be susceptible of variations in its frequency.

3. An apparatus for testing textiles comprising spaced independent vibratable members adapted to impart vibrations to the upper ends respectively of a thread to be tested and of a thread indicating the corrections due to variations of frequency, means connected with the other end of each thread for exerting a tension on the same, and electrical means operated by a single alternating current for producing vibration of the vibratable members.

4. An apparatus for testing textiles comprising a yoke the downwardly extending legs of which consists of spaced vibratable members provided at their lower ends with thread receiving openings respectively for enabling the upper ends of a thread to be tested and of a thread indicating the corrections due to variations of frequency threaded through said openings to be simultaneously vibrated, means connected with the other ends of the threads for maintaining a tension on the same, and electro-magnets operated by the same electrical current for producing vibration of the vibratable members.

In testimony whereof I have signed my name to this specification.

JOSEPH EDOUARD GUSTAVE LAHOUSSE.